US012750896B2

(12) United States Patent
Haswarey et al.

(10) Patent No.: US 12,750,896 B2
(45) Date of Patent: Sep. 29, 2026

(54) MOBILE VIRTUAL NETWORK OPERATOR PACKET GATEWAY VIA A SPONSOR MOBILE WIRELESS NETWORK OPERATOR ROUTING AGENT

(71) Applicant: T-MOBILE INNOVATIONS LLC, Overland Park, KS (US)

(72) Inventors: Bashir A. Haswarey, Elmhurst, IL (US); Mohammad Abu-Samra, Orland Park, IL (US); Neelam Tripathi, Lincolnshire, IL (US); Narothum Saxena, Hoffman Estates, IL (US); Michael S. Irizarry, Barrington Hills, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 285 days.

(21) Appl. No.: 18/680,897

(22) Filed: May 31, 2024

(65) Prior Publication Data

US 2025/0374338 A1 Dec. 4, 2025

(51) Int. Cl.
*H04W 8/18* (2009.01)
*H04L 61/4511* (2022.01)
(Continued)

(52) U.S. Cl.
CPC ......... *H04W 76/10* (2018.02); *H04L 61/4511* (2022.05); *H04L 61/50* (2022.05); *H04L 2101/654* (2022.05)

(58) Field of Classification Search
CPC ........ H04W 8/183; H04W 8/082; H04W 8/12
See application file for complete search history.

(56) References Cited

U.S. PATENT DOCUMENTS 10,200,852 B1 * 2/2019 Datar ...................... H04W 8/06
10,735,940 B1 * 8/2020 Sharma .................. H04W 8/12
(Continued)

OTHER PUBLICATIONS

Universal Mobile Telecommunications System (UMTS); LTE; 5G; 3GPP Evolved Packet System (EPS); Evolved General Packet Radio Service (GPRS) Tunnelling Protocol for Control plane (GTPv2-C); Stage 3 (3GPP TS 29.274 version 17.9.0 Release 17, ETSI TS 129 274 V17.9.0 (Jul. 2023)) (Year: 2023).*

*Primary Examiner* — Romani Ohri
(74) *Attorney, Agent, or Firm* — SHOOK, HARDY & BACON L.L.P.; Elena K. McFarland

(57) ABSTRACT

A method, carried out by a mobile network operator (MNO) core component, is described for supporting connection signaling between a user equipment and core network components of a mobile virtual network operator (MVNO). The method includes receiving an update location answer (ULA) message that specifies a leased IMSI value of the user equipment. The MNO core component determines that the leased IMSI value of the user equipment falls within a range of the IMSI block allocated to the MVNO. The MNO core component generates a modified ULA including a changed access point name (APN). The modified ULA is forwarded to a mobility management entity (MME) component that uses the modified ULA to generate a create session request (CSR) message, and the changed APN of the modified ULA causes the MME component to send the CSR message to a GPRS tunneling protocol (GTP) proxy of the primary MNO.

20 Claims, 3 Drawing Sheets

(51) Int. Cl.

| | |
|---|---|
| ***H04L 61/50*** | (2022.01) |
| ***H04W 8/08*** | (2009.01) |
| ***H04W 76/10*** | (2018.01) |
| *H04L 101/654* | (2022.01) |

(56) References Cited

U.S. PATENT DOCUMENTS

| | | | | |
|---|---|---|---|---|
| 11,564,081 | B1 * | 1/2023 | Gundavelli | H04W 8/205 |
| 11,622,259 | B2 * | 4/2023 | Roy | H04W 12/40 455/419 |
| 11,785,456 | B2 * | 10/2023 | Gundavelli | H04W 12/40 726/7 |
| 2014/0274034 | A1 * | 9/2014 | Trapp | H04W 8/06 455/433 |
| 2016/0066175 | A1 * | 3/2016 | Wang | H04W 8/02 455/432.1 |
| 2019/0053185 | A1 * | 2/2019 | Shah | H04W 8/205 |
| 2019/0327603 | A1 * | 10/2019 | De Figueiredo Junior | H04L 41/08 |
| 2024/0340631 | A1 * | 10/2024 | Homorodi | H04W 12/037 |

* cited by examiner

MOBILE VIRTUAL NETWORK OPERATOR PACKET GATEWAY VIA A SPONSOR MOBILE WIRELESS NETWORK OPERATOR ROUTING AGENT

FIELD OF THE INVENTION

The present disclosure generally relates to mobile wireless communications. More particularly, the present disclosure is directed to providing mobile wireless network access between user equipment and mobile virtual network operator core network components via a sponsoring mobile wireless network operator.

BACKGROUND OF THE INVENTION

A variety of entities maintain mobile virtual networks, including at least a mobile wireless network core. In such case, a mobile virtual network operator (MVNO) configures and maintains an MVNO core network for managing a group of associated mobile wireless devices. The MVNO desires that such associated user equipment (UE), also referred to as mobile wireless devices, have a capability to connect via sponsoring mobile wireless network operators (MNOs) to management components of the MVNO core via a packet gateway of the MVNO core network.

A potential challenge arises in such cases for sponsoring MNOs to determine whether to grant a request from a user equipment associated with an MVNO to attach to a mobile wireless network. In particular, managing access requests (including routing such requests to appropriate MVNO access management agents) for thousands, tens of thousands, hundreds of thousands, and even millions of unique device identifiers of valid user equipment devices associated with particular MVNOs is a monumental task.

A solution to such challenge is proposed herein below, by way of illustrative examples of modifications to at least one component of an MNO core network (e.g., a diameter routing agent—DRA), that informs the component of ranges (blocks) of subscriber identity (e.g., International Mobile Subscriber Identity—IMSI) values assigned to particular MVNOs (having an identified packet gateway—PGW). As such, all attach requests for user equipment having IMSI values falling within a pre-configured range are forwarded by a GPRS tunneling protocol (GTP) proxy of the sponsoring network to the PGW of the MVNO corresponding to the pre-configured range.

SUMMARY OF THE INVENTION

A method, carried out by a sponsoring network core, is described. More particularly, the method is carried out by a mobile network operator (MNO) core component of a primary MNO to support connection signaling between a user equipment and core network components of a mobile virtual network operator (MVNO) to which an international mobile subscriber identity (IMSI) block has been allocated to the MVNO in accordance with a sponsoring relationship between the primary MNO and the MVNO and wherein the user equipment has a leased IMSI value within a range of IMSI values of the IMSI block.

In this context, the method includes receiving, by the MNO core component, an update location answer (ULA) message issued by an MVNO core component. The ULA message specifies a leased IMSI value of the user equipment. The method further includes determining, by the MNO core component, that the leased IMSI value of the user equipment falls within a range of the IMSI block allocated to the MVNO in accordance with the sponsoring relationship between the primary MNO and the MVNO. The MNO core component generates a modified ULA including a changed access point name (APN) in accordance with the determining. The method further includes forwarding the modified ULA to a mobility management entity (MME) component. The modified ULA is used by the MME component to generate a user equipment create session request (CSR) message, and the changed APN of the modified ULA causes the MME component to send the CSR message to a GPRS tunneling protocol (GTP) proxy of the primary MNO.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
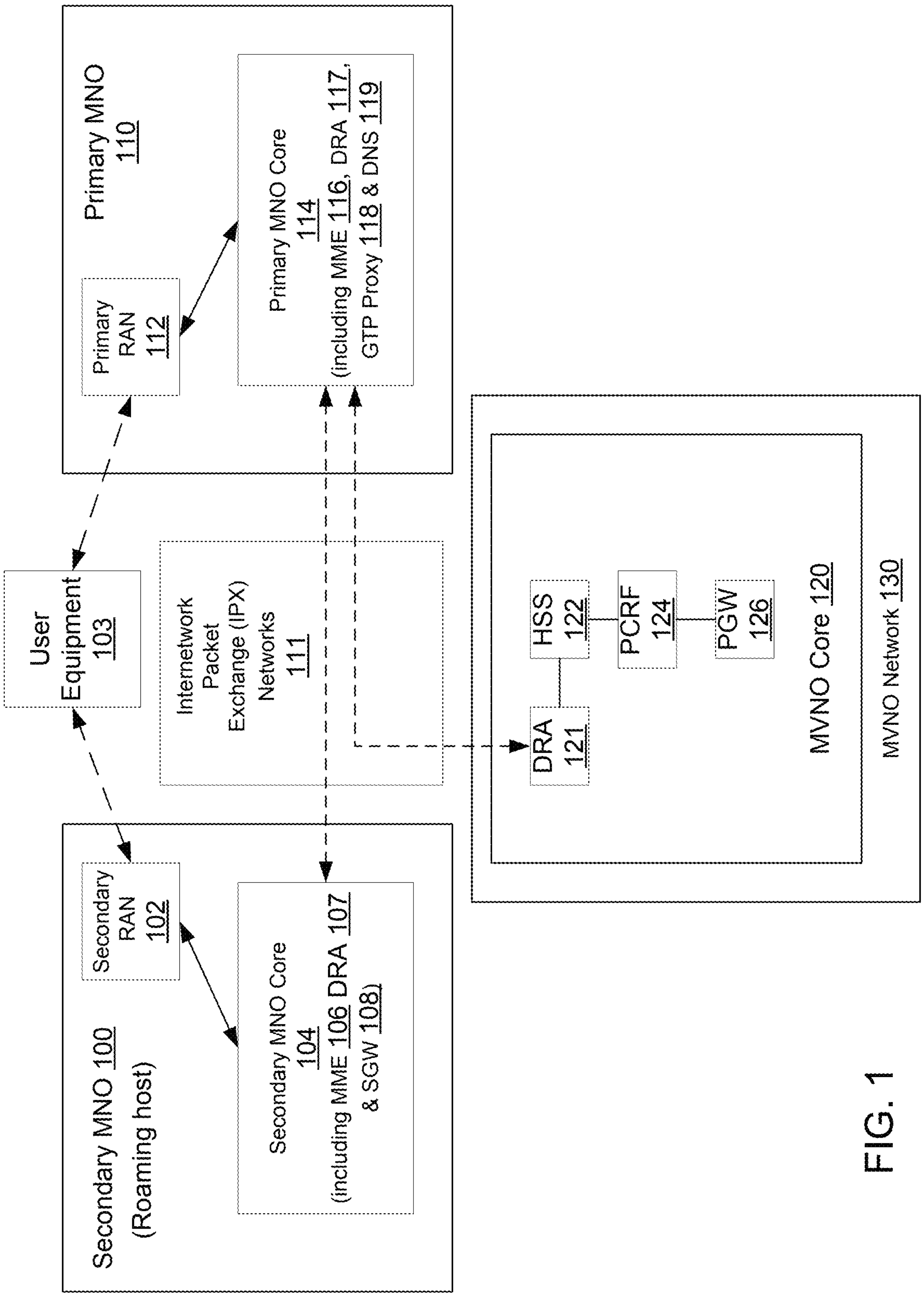
FIG. 1 is a schematic diagram of an exemplary mobile wireless network environment including a primary MNO, a secondary MNO, and a mobile virtual network operator including a mobile virtual network operator core network in accordance with the disclosure.

A system, in accordance with the present disclosure, includes a primary MNO that administratively sponsors UE devices associated with a mobile virtual network operator (MVNO). Such support may be carried out via a secondary MNO providing roaming access for the private UE devices on behalf of the primary MNO. In a first scenario (summarized in FIG. 2A described herein below), where the UE issues an attach request (AR) on the primary MNO's network (a.k.a. On-net), the UE attaches with a requested APN (APN-R) that is not known to the primary MNO. The method summarized by the sequence diagram of FIG. 2A, facilitates routing of an On-net attach request to the primary MNO GTP proxy. In a second scenario (summarized in FIG. 2B described herein below), where the UE issues an attach request (AR) to the secondary MNO's network (a.k.a. Off-net), the UE attaches with a requested APN (APN-R) not known to both the Primary MNO and the Secondary MNO. The method summarized by the sequence diagram of FIG. 2B, facilitates routing of an Off-net attach request to the primary MNO GTP proxy.

The above-summarized operation of a primary MNO, providing support of a user equipment having an assigned IMSI value falling within a pre-configured range of IMSI values corresponding to an MVNO sponsored by the primary MNO, is further described in accordance with detailed examples summarized in the drawings described in detail herein below.

Turning to FIG. 1, an exemplary environment for carrying out the present disclosure is schematically depicted. A secondary mobile network operator (MNO) 100, operating as a roaming mobile wireless services host, includes a secondary radio access network (RAN) 102 and a secondary MNO core 104 network. The secondary RAN 102 is configured to receive a Diameter Protocol connection signaling message from a user equipment 103 for mobile wireless data network services. The secondary MNO core 104 includes a mobility management entity (MME) 106, a DRA 107, and a source gateway (SGW) 108.

The secondary MNO 100 is configured to communicate with a primary MNO 110 (or more generally a network operator (NO) that may/may not operate an associated RAN) via an internetwork data packet exchange (IPX) of a plurality of IPX networks 111. By way of example, communication between the secondary MNO 100 and primary MNO 110 is carried out in accordance with IR.21 (GSM Association Roaming Database, Structure and Updating Procedures) under which the IMSI blocks (ranges of IMSI values) assigned to the primary MNO 110 are published to all secondary MNOs, including the secondary MNO 100.

The primary MNO 110 includes a primary RAN 112 and a primary MNO core 114. The primary RAN 112 is configured to receive a Diameter Protocol connection signaling message from the user equipment 103 for mobile wireless data network services. The primary MNO core 114 includes an MME 116, a DRA 117 and a GTP Proxy 118. In accordance with the present disclosure, the DRA 117 is configured to perform an access point name (APN) subscription (APN-S) replacement and/or modification operation in received ULA messages belonging to IMSI values falling within a range for sponsored MVNOs—the functionality of which has been briefly discussed herein above. A domain name server (DNS) 119 is configured with a replacement APN-S fully qualified domain name (FQDN). The APN-S FQDN is an identifier in the DNS that resolves to the GTP proxy 118 to allow routing of On-net and Off-net attach request (Create Session Request message).

With continued reference to FIG. 1, a MVNO network 130 includes a MVNO core 120. The MVNO core 120 includes a set of core network components for administering a group of associated mobile devices. The set of core network components includes, for example: a DRA 121, a home subscriber server (HSS) 122, a PCRF 124, and a PGW 126. The MVNO core 120 may also include an MME and/or an SGW (not shown).

With continued reference to FIG. 1, it is noted that simplified depictions are provided of the primary MNO 110, the secondary MNO 100, and the MVNO network 130 to emphasize enhanced aspects of the primary MNO 110 relating to the DRA 116 operating as an intermediate routing node between the user equipment 103 and components of the MVNO core 120.

Figure 2A:
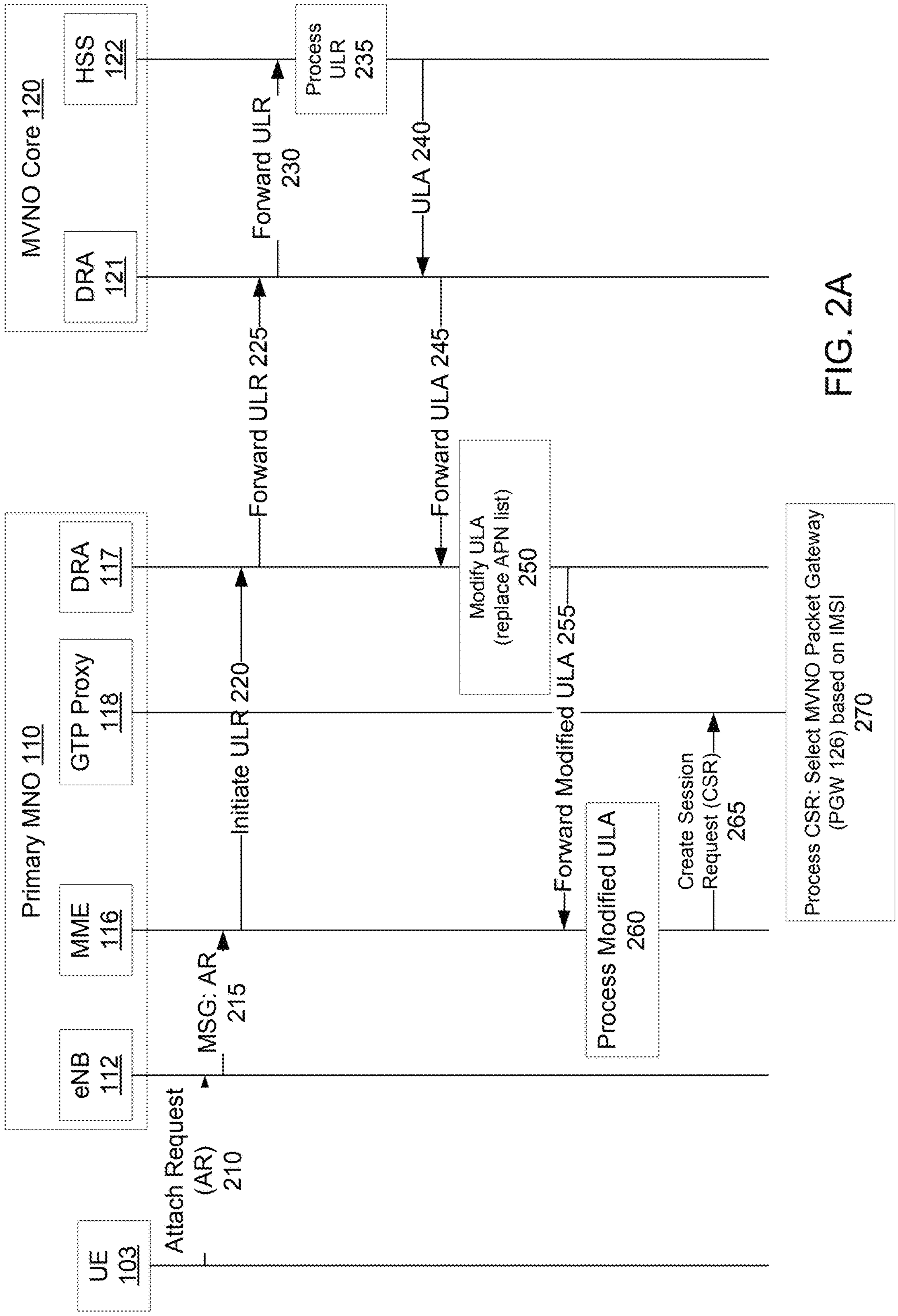
FIG. 2A is a sequence diagram summarizing messaging flow for executing connection signaling messaging in a case where a user equipment (UE) seeks to establish connection to a mobile wireless network via signaling to a private network core (e.g., MVNO core) through an primary mobile network operator radio access network (RAN) in accordance with a first illustrative example of the disclosure.

Turning to FIG. 2A, a sequence diagram summarizes a message flow for handling an On-net (i.e. via the primary MNO 110) Attach Request (AR) by the user equipment 103 that is associated with the MVNO Network 130 (i.e., has an IMSI within a range of IMSI values allocated to mobile devices associated with the MVNO Network 130). The attach request is used to establish mobile wireless service connectivity for the UE 103, via the primary RAN 112 of the primary MNO 110. In that regard, during 210 the user equipment 103 issues an attach request to the eNB 112. During 215, the eNB 112 (generally RAN component) forwards the attach request (via messaging) to the MME 116. During 220 the MME 116 processes the received attach request and initiates/sends an associated Update Location Request (ULR) message to the DRA 117 (ultimately destined for the HSS 122 of the MVNO core 120).

In accordance with standard ULR message handling, during 225 the DRA 117 forwards, without modification the ULR message to the DRA 121 of the MVNO Core 120. During 230 the DRA 121 forwards the ULR message to the HSS 122. The HSS 122, during 235, processes the received ULR. During 240 the HSS 122 of the MVNO core 120 determines that the ULR message is valid and issues an Update Location Answer (ULA) message to the DRA 121 of the MVNO 120. The DRA 121, during 245, forwards the ULA message to the DRA 117 of the primary MNO 110 for further processing in accordance with the present disclosure.

With continued reference to FIG. 2A, in accordance with a particular aspect of the present disclosure, the primary MNO core network 114 is configured to detect, within received ULA messages from a DRA of a sponsored MVNO, IMSI values falling within a range for an IMSI block assigned to the MVNO (corresponding to the MVNO network 130 having MVNO core 120) sponsored by the primary MNO 110.

During 250, upon determining that the IMSI value is in a range of IMSI's assigned to the sponsored MVNO corresponding to the MVNO core 120, the DRA 117 replaces all subscribed APNs (APN-Ss) in the received ULA message with a dummy APN as subscribed APN (APN-S) that guarantees an APN mismatch during processing of the modified ULA passed to the MME 116 during 255. The form and/or content of the dummy APN placed in the modified ULA message by the DRA 117 is constrained only by a need for the value of the dummy APN to always result in a mismatch event when the modified ULA is processed by the MME 116 during 260.

With reference to operation 260 of FIG. 2A, during processing of the modified ULA message, the MME 116 detects a mismatch between the dummy APN (APN-S) value inserted into the modified ULA during 250 and a request APN (APN-R), from the UE 103, received during 215. As part of the mismatch handling process, the MME 116 checks for a match of the APN-R in the APN-S. In accordance with being unable to identify/find a match of the APN-R with APN-S, the MME 116 declares a mismatch and executes a "mismatch condition" policy operation/function that is configured to use the dummy APN (APN-S) that is resolved, by submitting a name resolution request to the DNS 119, to (selects as a destination) the GTP proxy 118.

During 265, the MME 116 issues a create session request (CSR) to the GTP proxy 118 that is configured with the IMSI blocks and the associated PGW 126, allowing the GTP proxy 118, during 270, to determine a destination and route the received CSR, based on the IMSI in the received CSR, to the target MVNO's PGW 126.

Thus, during 270, in accordance with known CSR message processing, the GTP Proxy 118 (topologically closest to the MME 116) selects the PGW 126 of the MVNO core 120 based on the IMSI value contained in the received CSR message from the MME 116.

Figure 2B:
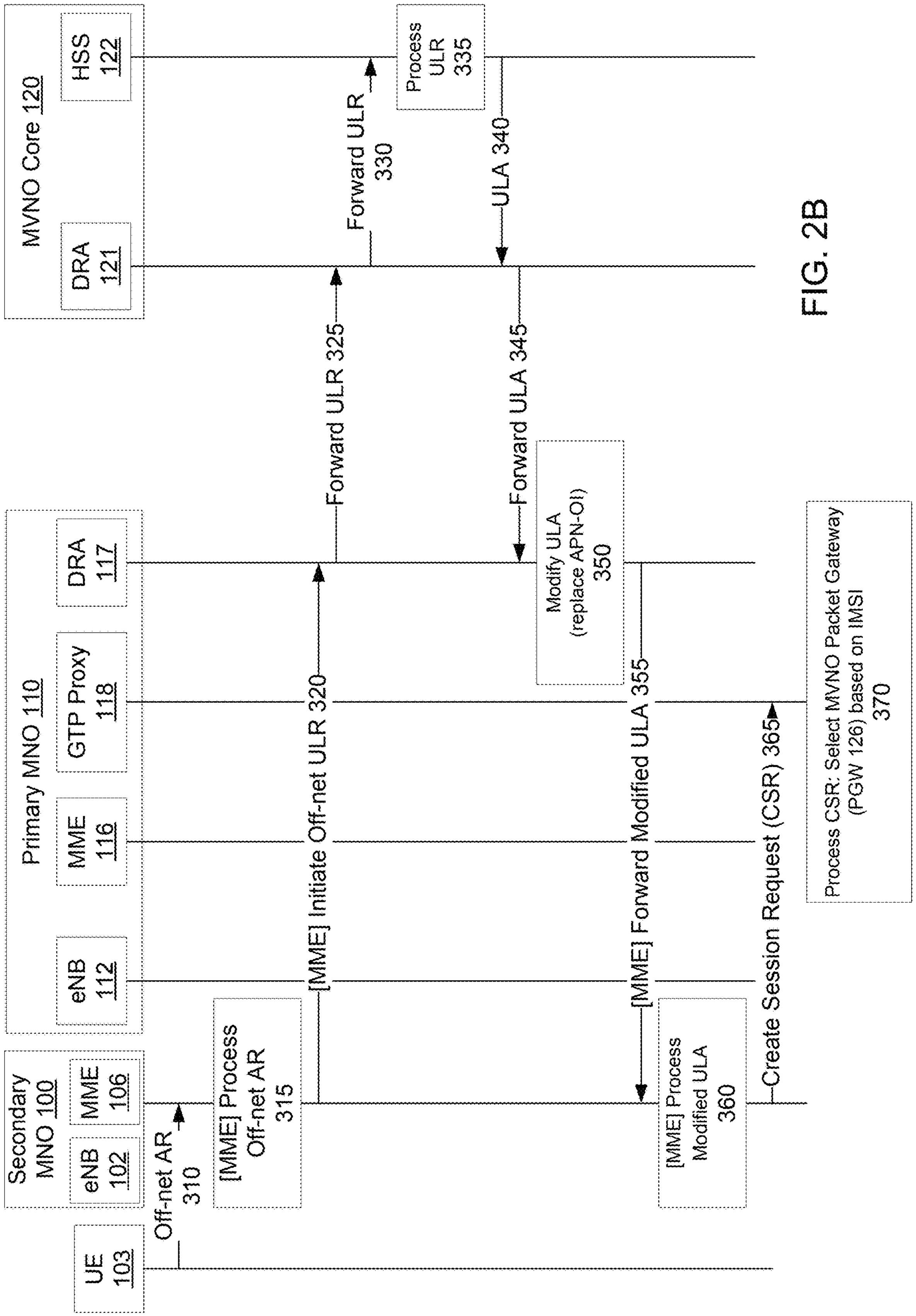
FIG. 2B is a sequence diagram summarizing messaging flow for executing connection signaling messaging in a case where a user equipment (UE) seeks to establish connection to a mobile wireless network via signaling to a private network core (e.g., MVNO core) through a secondary mobile network operator radio access network (RAN) in accordance with a second illustrative example of the disclosure.

Turning to FIG. 2B, a sequence diagram summarizes a message flow for handling an Off-net (i.e. via the secondary MNO 100) attach request (AR) by the user equipment 103 that is associated with the MVNO Network 130 (i.e., has an IMSI within a range of IMSI values allocated to mobile devices associated with the MVNO Network 130). The attach request is used to establish mobile wireless service connectivity for the UE 103, via the secondary RAN 102 of the secondary MNO 100. In that regard, during 310 the user equipment 103 issues an off-network attach request message to the secondary RAN 102 (e.g., an eNB) of the secondary MNO 100 that, in turn, forwards the attach request message to the MME 106 of the secondary MNO 100.

Thereafter, during 315, the MME 106 processes the contents of the attach request message, and during 320 sends a message to initiate generating an Update Location Request (ULR) message to the DRA 117 (of the primary MNO 110 sponsoring the MVNO with which the UE 103 is affiliated).

In accordance with standard ULR message handling, during 325 the DRA 117 forwards, without modification, the ULR message to the DRA 121 of the MVNO Core 120. During 330 the DRA 121 forwards the ULR message to the HSS 122. The HSS 122, during 335, processes the received ULR. During 340 the HSS 122 of the MVNO core 120 determines that the ULR message is valid and issues an Update Location Answer (ULA) message to the DRA 121 of the MVNO 120. The DRA 121, during 345, forwards the ULA message to the DRA 117 of the primary MNO 110 for further processing in accordance with the present disclosure. The ULA message includes subscribed APN(s) (APN-S) APN-S for the MVNO corresponding to the MVNO core 120. More particularly, the ULA includes both an APN-NI (network identifier) and an APN-OI (operator identifier), which may be global and/or local in scope.

With continued reference to FIG. 2B, in accordance with a particular aspect of an alternative example of the present disclosure, the DRA 117 of the primary MNO core network 114 is configured to detect, within received ULA messages from the DRA 121 of the sponsored MVNO, IMSI values falling within a range for an IMSI block assigned to the MVNO (corresponding to the MVNO network 130 having MVNO core 120) sponsored by the primary MNO 110.

During 350, upon determining that the IMSI value is in a range of IMSI's assigned to the sponsored MVNO corresponding to the MVNO core 120, the DRA 117 generates a modified ULA message (from the received ULA message) that includes a modified APN-S. More specifically, the DRA 117 leaves the received APN-NI (corresponding to the primary MNO 110) unchanged. However, the DRA 117 removes, if present, the local and global APN-OI in the received ULA. Thereafter, the DRA 117 updates the received ULA message by inserting a primary MNO defined "global APN-OI" unique to the MVNO (that, when resolved by a distributed naming service (DNS 119) where the DNS 119 is configured with the APN FQDN specified in the form of a wildcard followed by the APN-OI label, which causes the Create Session Request (CSR) message to be directed to the GTP proxy 118 of the primary MNO 110 (the destination for all CSR messages).

During 355 the modified ULA message is passed from the DRA 117 to the MME 106 of the Secondary MNO 100.

During 360, in accordance with standard processing of received ULA messages, the MME 106 looks up a target GTP proxy for receiving an CSR based on the modified APN-S containing the primary MNO defined "global APN-OI" unique to the MVNO inserted by the DRA 117 during 350. During 360, the MME 106 constructs the target APN FQDN using the APN-NI (a.k.a. APN-S) and the global APN-OI (found in the modified ULA), to always result in the secondary MNO 100 resolving the target APN FQDN to the GTP Proxy 118 IP address via the primary MNO's 110 DNS 119 (where the APN-NI portion of the target APN FQDN is configured as a wildcard, such as for example the '*' character).

During 365 the MME 106 issues a create session request (CSR) (including the originally provided IMSI that caused exception handling by the DRA 117 during 350) to the GTP Proxy 118 of the primary MNO 110.

Thereafter, during 370, in accordance with known CSR message processing, the GTP Proxy 118 (topologically closest to the MME 116) selects the PGW 126 of the MVNO core 120 based on the IMSI value contained in the received CSR message from the MME 116.

The above-described examples are intended to be exemplary in nature, as there are multiple alternative ways for modifying a primary MVNO core to support IMSI range-based handling of forwarding user equipment ULR messages to a sponsored MVNO core network in accordance with the disclosure provided herein.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a mobile network operator (MNO) core component of a primary MNO to support connection signaling between a user equipment and core network components of a mobile virtual network operator (MVNO) to which an international mobile subscriber identity (IMSI) block has been allocated to the MVNO in accordance with a sponsoring relationship between the primary MNO and the MVNO, wherein the user equipment has a leased IMSI value within a range of IMSI values of the IMSI block, and wherein the method comprises:

receiving, by the MNO core component, an update location answer (ULA) message issued by an MVNO core component, wherein the ULA message specifies a leased IMSI value of the user equipment;

determining, by the MNO core component, that the leased IMSI value of the user equipment falls within a range of the IMSI block allocated to the MVNO in accordance with the sponsoring relationship between the primary MNO and the MVNO;

generating, by the MNO core component in accordance with the determining, a modified ULA including a changed access point name (APN); and forwarding the modified ULA to a mobility management entity (MME) component, wherein the modified ULA is used by the MME component to generate a create session request (CSR) message, and wherein the changed APN of the modified ULA causes the MME component to send the CSR message to a GPRS tunneling protocol (GTP) proxy of the primary MNO.

2. The method of claim 1, wherein the MNO core component comprises a Diameter Routing Agent (DRA) function.

3. The method of claim 2, wherein during the generating a modified ULA including a changed APN, the DRA replaces at least one APN in the received ULA message with a dummy APN that ensures an APN mismatch during processing of the modified ULA by the MME component.

4. The method of claim 3, wherein the MME component operates in a core network of the primary MNO.

5. The method of claim 2, wherein during the generating a modified ULA including a changed APN, the DRA specifies, for an APN operator identifier (APN-OI) of the APN FQDN in the received ULA message, a global APN-OI value, wherein during processing of the changed APN by the MME component, the changed APN is resolved by a distributed naming service (DNS) to the GTP proxy of the primary MNO.

6. The method of claim 5, wherein the MME component operates in a core network of a secondary MNO.

7. The method of claim 5, wherein the changed APN includes an APN network identifier (APN-NI) that is the same as a received APN-NI of the APN in the received ULA message.

8. A mobile network operator (MNO) core component comprising:

a processor; and a non-transitory computer-readable medium including computer-executable instructions that, when executed by the processor, facilitate the MNO core component carrying out a method supporting connection signaling between a user equipment and core network components of a mobile virtual network operator (MVNO) to which an international mobile subscriber identity (IMSI) block has been allocated to the MVNO in accordance with a sponsoring relationship between the primary MNO and the MVNO, wherein the user equipment has a leased IMSI value within a range of IMSI values of the IMSI block, and wherein the method comprises:

receiving, by the MNO core component, an update location answer (ULA) message issued by an MVNO core component, wherein the ULA message specifies a leased IMSI value of the user equipment;

determining, by the MNO core component, that the leased IMSI value of the user equipment falls within a range of the IMSI block allocated to the MVNO in accordance with the sponsoring relationship between the primary MNO and the MVNO;

generating, by the MNO core component in accordance with the determining, a modified ULA including a changed access point name (APN); and forwarding the modified ULA to a mobility management entity (MME) component, wherein the modified ULA is used by the MME component to generate a create session request (CSR) message, and wherein the changed APN of the modified ULA causes the MME component to send the CSR message to a GPRS tunneling protocol (GTP) proxy of the primary MNO.

9. The MNO core component of claim 8, wherein the MNO core component comprises a Diameter Routing Agent (DRA) function.

10. The MNO core component of claim 9, wherein during the generating a modified ULA including a changed APN, the DRA replaces at least one APN in the received ULA message with a dummy APN that ensures an APN mismatch during processing of the modified ULA by the MME component.

11. The MNO core component of claim 10, wherein the MME component operates in a core network of the primary MNO.

12. The MNO core component of claim 9, wherein during the generating a modified ULA including a changed APN, the DRA specifies, for an APN operator identifier (APN-OI) of the APN FQDN in the received ULA message, a global APN-OI value, wherein during processing of the changed APN by the MME component, the changed APN is resolved by a distributed naming service (DNS) to the GTP proxy of the primary MNO.

13. The MNO core component of claim 12, wherein the MME component operates in a core network of a secondary MNO.

14. The MNO core component of claim 12, wherein the changed APN includes an APN network identifier (APN-NI) that is the same as a received APN-NI of the APN in the received ULA message.

15. A system comprising:

a Diameter Routing Agent (DRA) component;

a mobility management entity (MME) component; and a GPRS tunneling protocol (GTP) proxy component, wherein the DRA, MME and GTP proxy are configured to cooperatively operate to carry out a method for supporting connection signaling between a user equipment and core network components of a mobile virtual network operator (MVNO) to which an international mobile subscriber identity (IMSI) block has been allocated to the MVNO in accordance with a sponsoring relationship between the primary MNO and the MVNO, wherein the user equipment has a leased IMSI value within a range of IMSI values of the IMSI block, and wherein the method comprises:

receiving, by the DRA, an update location answer (ULA) message issued by an MVNO core component, wherein the ULA message specifies a leased IMSI value of the user equipment;

determining, by the DRA, that the leased IMSI value of the user equipment falls within a range of the IMSI block allocated to the MVNO in accordance with the sponsoring relationship between the primary MNO and the MVNO;

generating, by the DRA in accordance with the determining, a modified ULA including a changed access point name (APN); and forwarding the modified ULA to the MME component;

generating, by the MME in accordance with the modified ULA, a create session request (CSR) message, and sending, by the MME in accordance with the changed APN of the modified ULA, the CSR message to the GTP proxy of the primary MNO.

16. The system of claim 15, wherein during the generating a modified ULA including a changed APN, the DRA replaces at least one APN in the received ULA message with a dummy APN that ensures an APN mismatch during processing of the modified ULA by the MME.

17. The system of claim 16, wherein the MME operates in a core network of the primary MNO.

18. The system of claim 15, wherein during the generating a modified ULA including a changed APN, the DRA specifies, for an APN operator identifier (APN-OI) of the APN FQDN in the received ULA message, a global APN-OI value, wherein during processing of the changed APN by the MME component, the changed APN is resolved by a distributed naming service (DNS) to the GTP proxy of the primary MNO.

19. The system of claim 18, wherein the MME operates in a core network of a secondary MNO.

20. The system of claim 18, wherein the changed APN includes an APN network identifier (APN-NI) that is the same as a received APN-NI of the APN in the received ULA message.

* * * * *